July 15, 1930.  C. F. JOHNSON  1,770,648
WEEDING ATTACHMENT FOR CULTIVATORS
Filed April 23, 1929
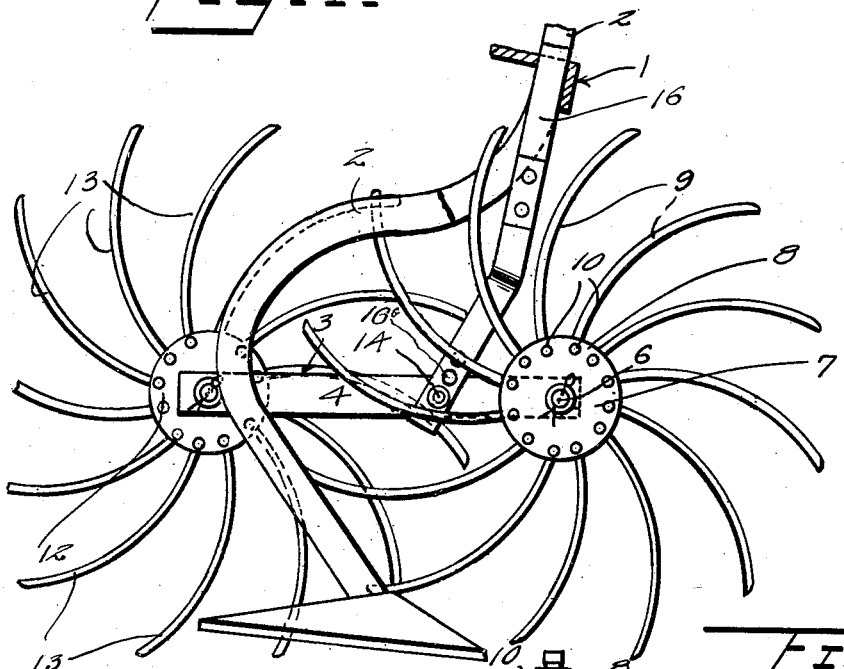
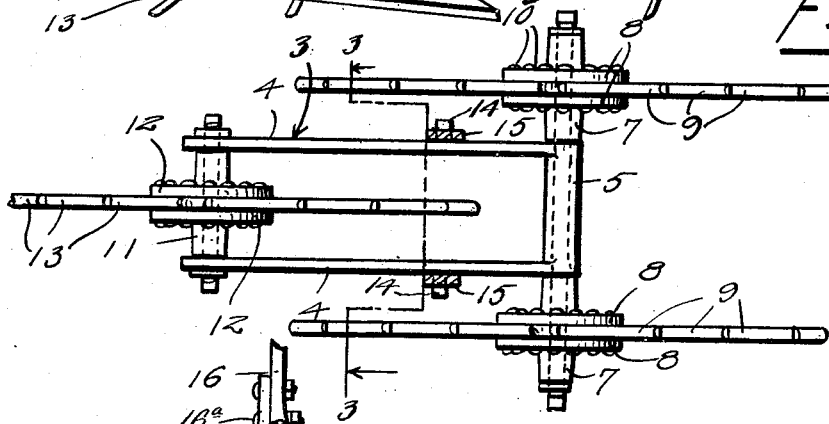
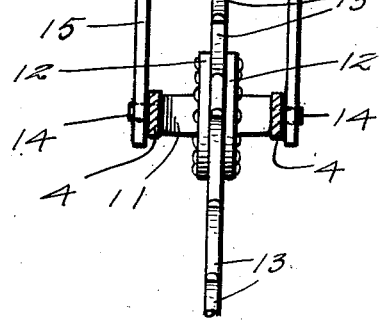
Inventor
C. F. Johnson
By Watson E. Coleman
Attorney Patented July 15, 1930

1,770,648

UNITED STATES PATENT OFFICE

CORNELIUS F. JOHNSON, OF POWELL, WYOMING

WEEDING ATTACHMENT FOR CULTIVATORS

Application filed April 23, 1929. Serial No. 357,469.

This invention relates to weeding devices and pertains particularly to a device designed for attachment to a cultivator used for cultivating corn, beet and pea plants.

The primary object of the present invention is to provide an improved weeder employing a plurality of rotating fingers which are so formed that when the weeder is drawn over the ground the fingers will penetrate the earth and extract the weeds therefrom.

Another object of the invention is to provide a weeding device of such a character that a number thereof may be readily attached to the cultivating machine to travel between the plows thereof when the same are being used for siding up the hills, the weeders traveling upon the hills between the plows to remove weeds therefrom.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of the weeder embodying the present invention showing the same in association with a cultivator plow.

Figure 2 is a top plan view of the present weeder structure.

Figure 3 is a sectional view taken upon the line 3—3 of Figure 2.

Referring to the drawing in detail, Figure 1 shows a portion of a cultivator frame showing a plow attached thereto, the frame being indicated by the numeral 1 and the plow by the numeral 2. In association with a pair of plows of this character the weeder device embodying the present invention is designed to be used, this device being indicated as a whole by the numeral 3.

The weeder 3 comprises a cast frame which includes a pair of spaced parallel side bars 4 connected at the forward end by a cross tubular member or sleeve 5 through which extends a shaft 6. Each end of the shaft upon the outside of the adjacent frame bar 4 extends through the hub 7 of a weeder wheel which comprises a pair of plates 8 arranged in side by side relation and carried by the hub 7, and a plurality of radially disposed curved digging fingers 9. The inner ends of the fingers 9 are secured between the plates 8, these plates 8 being drawn together to hold the digging fingers 9 therebetween by a plurality of transverse bolts 10.

Positioned between the rear ends of the side members 4 of the weeder frame is a weeder wheel which like the two at the front part of the frame consists of a hub portion 11 which comprises a pair of spaced circular plates 12 held in side by side relation by suitable bolt members and gripping therebetween a radially disposed series of curved digging or earth penetrating fingers 13.

Each of the rails 4 has cast integral therewith and projecting laterally therefrom and adjacent the forward end thereof a pin 14 which is detachably engaged in an aperture 16$^b$ on the end of one arm of a two part U-shaped yoke member 15 which straddles the weeder frame in the manner shown. This two part U-shaped member is separated at the central portion of the yoke thereof, one of the parts having a bar 16 projecting therefrom which is designed for engagement with the cultivator beam 1 to which the plow 2 is attached, the other part of the yoke being detachably secured to the bar by the bolt members 16$^a$, as shown in Figure 3.

The earth penetrating fingers 9 and 13 of the weeder wheels are so directed that as the wheels move forwardly they will enter the ground at a rearward inclination coming up therefrom in such a manner as to pick or spade up the earth thereby extracting any weeds which may be adjacent thereto.

As shown in Figure 1, the fingers 9 of the front weeder wheels and the fingers 13 of the rear weeder wheel are of sufficient length to overlap a substantial distance.

This device is designed to be used after the hills have been planted and before the young plants reach a height of more than one inch. By providing the side pieces of the yoke 15 with a plurality of apertures, as indicated by the numeral 16ᵇ, the device can be so adjusted that the fingers will penetrate the earth from 1 to 3 inches so that the seeds in the ground over which the device passes will not be disturbed thereby. After the plants are up, the device can be run thereover to remove weeds from the hills without fear of removing the plants as the weeder will not disturb plants having feeder roots.

By adjusting the U-shaped yoke 15 upon the lugs 14, as previously described, the depth of penetration of the fingers 9 and 13 can be controlled and also in view of the location of the lugs 14, the bar 16 of the yoke will be maintained in normally vertical position and the device therefore rigidly held against the ground.

While I have described the weeder wheels as constructed of a series of units, that is, carrying hubs, retaining plates carried by the hubs and fingers secured between the plates, it is, of course, to be understood that I do not wish to be limited to a wheel of this construction for it will be readily understood that these wheels may be of cast metal in which case the hubs, plates and earth penetrating fingers will be integrally connected.

From the foregoing description it will be readily seen that with a weeder device of the character described a number thereof may be attached to a cultivating machine between the plows thereof to run upon the hills between which the plows pass removing weeds therefrom as the plows dig up the earth on each side of the hill in the usual manner.

Having thus described my invention, what I claim is:—

1. A weeding attachment for cultivators, comprising a relatively long substantially U-shaped frame, means for suspending said frame in substantially horizontal position from a cultivator frame, said U frame having the yoke portion formed to provide a sleeve, a shaft extending through said sleeve, a pair of elements on said shaft, one at each end thereof and each comprising a hub having a plurality of radially directed curved fingers secured thereto, and a rotary element mounted between the side members of said U frame at the end remote from said sleeve and comprising a hub having a plurality of radially disposed arcuate fingers extending therefrom.

2. A weeder attachment for cultivators, comprising a horizontally disposed substantially U-shaped frame having the yoke portion thereof formed to provide a sleeve, a shaft extending through said sleeve, a pair of rotary elements upon said shaft, one at each end thereof and each including a plurality of radially disposed arcuate fingers, a shaft connecting the free ends of the arms of said frame, a rotary element mounted upon said last shaft and including a plurality of radially disposed arcuate fingers, and a U-shaped member disposed across said frame and having the free ends of the sides thereof pivotally attached to the adjacent sides of the frame and further having an extension for facilitating the attachment of the weeder to a cultivator.

3. A weeder attachment for cultivators, comprising a substantially U-shaped frame normally disposed in horizontal position, a shaft extending across the closed end of the frame and carrying a rotary element upon each end, each element including a plurality of radially extending arcuate fingers, a rotary element disposed between the side members of the frame at the other end thereof and including a plurality of radially disposed arcuate fingers, a lug extending laterally from each side of said frame, and means for connecting said frame to a cultivator frame, comprising a substantially U-shaped member disposed across said frame and having the free end of each side thereof overlying the lug of the adjacent side member of the frame and formed to receive the same and further having an extension from the closed end thereof for attachment to the cultivator frame.

In testimony whereof I hereunto affix my signature.

CORNELIUS F. JOHNSON.